US011481140B1

(12) United States Patent
Ramanan et al.

(10) Patent No.: US 11,481,140 B1
(45) Date of Patent: Oct. 25, 2022

(54) DYNAMIC BASE DISK MIRRORING FOR LINKED CLONES

(71) Applicant: VMware, Inc., Palo Alto, CA (US)

(72) Inventors: Jyothir Ramanan, Hyderabad (IN); Matthew B Amdur, Cambridge, MA (US); Wenguang Wang, Santa Clara, CA (US); Enning Xiang, San Jose, CA (US)

(73) Assignee: VMWARE INC., Palo Alto, CA (US)

( * ) Notice: Subject to any disclaimer, the term of this patent is extended or adjusted under 35 U.S.C. 154(b) by 0 days.

(21) Appl. No.: 17/222,621

(22) Filed: Apr. 5, 2021

(51) Int. Cl.
*G06F 12/00* (2006.01)
*G06F 3/06* (2006.01)

(52) U.S. Cl.
CPC .............. *G06F 3/065* (2013.01); *G06F 3/061* (2013.01); *G06F 3/067* (2013.01)

(58) Field of Classification Search
CPC ........... G06F 3/065; G06F 3/061; G06F 3/067
See application file for complete search history.

(56) References Cited

U.S. PATENT DOCUMENTS

| 7,076,690 | B1 * | 7/2006 | Todd ................... G06F 11/2094 714/13 |
| 10,909,143 | B1 * | 2/2021 | Brahmadesam .... G06F 16/2228 |
| 2005/0262317 | A1 * | 11/2005 | Nakanishi ............. G06F 3/0635 711/112 |
| 2008/0155386 | A1 * | 6/2008 | Jensen ................ H04L 67/1002 709/224 |
| 2010/0036851 | A1 * | 2/2010 | Paterson-Jones ..... G06F 3/0619 707/E17.032 |
| 2015/0127833 | A1 * | 5/2015 | Hegdal ............... G06F 9/45558 709/226 |
| 2018/0121105 | A1 * | 5/2018 | Dain ..................... G06F 3/0641 |

* cited by examiner

Primary Examiner — Jason W Blust

(57) ABSTRACT

Techniques for implementing dynamic base disk mirroring for linked clones are provided. In one set of embodiments, a first node in a distributed storage system can monitor a congestion level of a base disk residing on the first node, where the base disk is shared by a plurality of linked clones. Upon determining that the congestion level exceeds a threshold, the first node can send, to a second node, a request to create a mirror of the base disk on that second node. Upon receiving an acknowledgement from the second node that the mirror has been successfully created, the first node can update a mirror set associated with the base disk to include an entry identifying the mirror. The first node can then communicate the updated mirror set to one or more other nodes.

18 Claims, 7 Drawing Sheets

DYNAMIC BASE DISK MIRRORING FOR LINKED CLONES

BACKGROUND

Unless otherwise indicated, the subject matter described in this section is not prior art to the claims of the present application and is not admitted as being prior art by inclusion in this section.

A linked clone is a virtual machine (VM) that is created from a point-in-time snapshot of another (i.e., parent) VM and shares with the parent VM—and with other linked clones created from the same snapshot—a base disk corresponding to the snapshotted state of the parent VM's virtual disk. Ongoing changes made by the parent VM to the virtual disk do not affect the linked clone because they are written to a separate delta disk that is specific to the parent VM. Similarly, changes made by the linked clone to the virtual disk do not affect the parent VM or other linked clones because they are written to a separate linked clone delta disk that is specific to that linked clone. Read requests issued by the parent VM or the linked clone to the virtual disk are first directed to their respective delta disks; if the read requests cannot be fulfilled there (which will be true for read requests for unmodified data), they are redirected to the shared base disk.

While linked cloning provides several benefits (e.g., high storage efficiency, fast clone creation, etc.) over alternative VM cloning mechanisms such as full cloning, creating a large number of linked clones from a single parent VM snapshot can impose a heavy I/O burden on the base disk due to the need to serve many, potentially concurrent read requests from the linked clones. This in turn can cause the base disk to become a bottleneck that limits the linked clones' performance. This issue is particularly problematic for virtual desktop deployments in which hundreds or thousands of virtual desktop linked clones may be created from a single "golden master" VM snapshot.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

The present disclosure is directed to techniques that can be implemented in a distributed storage system for dynamically mirroring base disks that are shared by linked clones. As used herein, a "mirror" of a base disk (or "base disk mirror") is a read-only copy of that base disk.

In one set of embodiments, a distributed storage system can monitor a congestion level of a base disk residing at a first node of the system and, upon determining that the congestion level has exceeded a threshold, create a mirror of the base disk at a second node different from the first node. The distributed storage system can then add the newly created mirror to a list of mirrors (i.e., mirror set) for the base disk and communicate the mirror set to all nodes (or all interested nodes) in the system. With an up-to-date mirror set for the base disk in place at each node, when a read request is received that needs to be redirected to the base disk, the distributed storage system can select, based on current disk congestion levels and/or other criteria, either the base disk or one of its mirrors as the actual target for serving the read request and send the request to the selected target. In this way, the distributed storage system can effectively load balance read I/O across the base disk and its mirrors, thereby reducing the base disk's congestion level and improving the storage performance of the linked clones sharing the base disk. In certain embodiments this mirror creation process can be repeated multiple times, resulting in the creation of multiple mirrors of the base disk up to, e.g., a user-configurable high watermark.

In a further set of embodiments, the distributed storage system can monitor the overall load (and/or other metrics) of the base disk and its mirrors created via the process above and, upon determining that the overall load has fallen below a threshold, delete one of the base disk mirrors. The distributed storage system can then remove the deleted mirror from the mirror set for the base disk and communicate the mirror set to all nodes (or all interested nodes) in the system. The result of these steps is that the deleted base disk mirror will no longer be used as a load balancing target for future read requests destined for the base disk. In addition, the storage space previously consumed by the deleted base disk mirror can be reused for other purposes. As with the mirror creation process, this mirror deletion process can be repeated multiple times until the total number of mirrors of the base disk drops to zero (or reaches a user-configurable low watermark).

2. Solution Architecture

Figure 1:
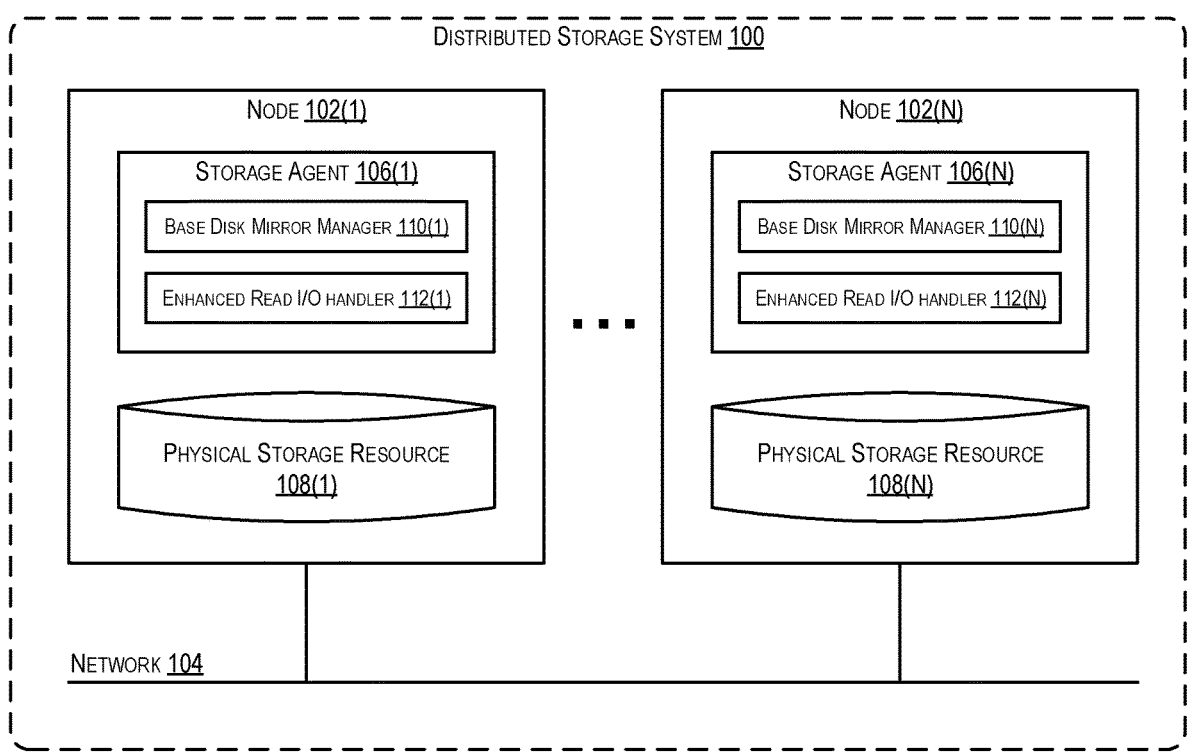
FIG. 1 depicts a distributed storage system according to certain embodiments.

FIG. 1 depicts the architecture of a distributed storage system 100 that implements the techniques of the present disclosure. As shown, distributed storage system 100 comprises a number of nodes 102(1)-(N) interconnected via a network 104. Each node 102 includes a storage agent 106 and a physical storage resource 108 composed of one or more physical storage devices (e.g., magnetic disks, solid-state disks (SSDs), etc.). In one set of embodiments, distributed storage system 100 may be a hyperconverged infrastructure (HCI) cluster and nodes 102(1)-(N) may be general-purpose computer systems (i.e., host systems) in the HCI cluster. In another set of embodiments, distributed storage system 100 may be a SAN (storage area network) or NAS (network attached storage)-based shared storage system and nodes 102(1)-(N) may be specialized storage servers/appliances in the shared storage system.

Figure 2A:
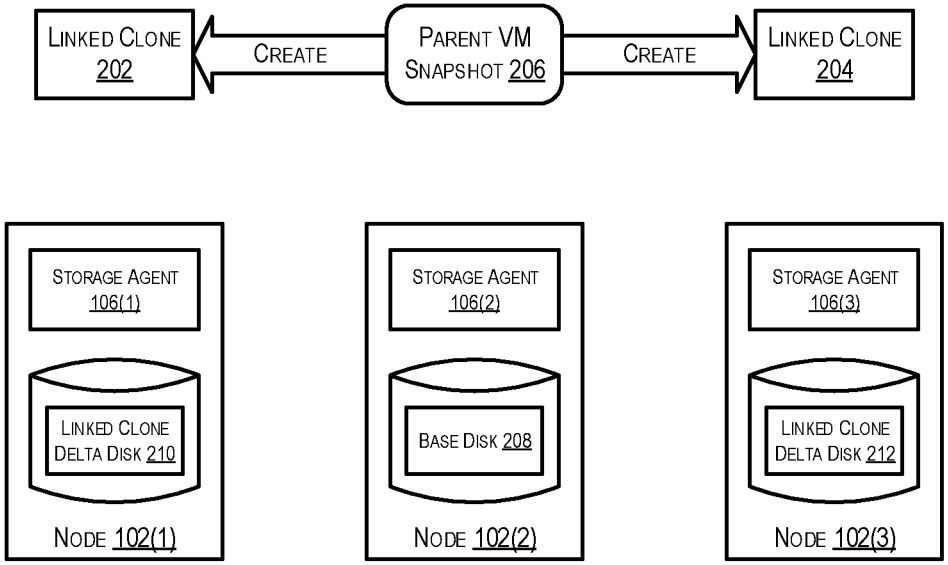
FIGS. 2A and 2B depict a scenario in which linked clones are created in the system of FIG. 1

Generally speaking, storage agents 106(1)-(N) of nodes 102(1)-(N) are configured to manage the storage of persistent data in physical storage resources 108(1)-(N) and make these resources available as a storage backend to storage clients. It is assumed that the persistent data managed by storage agents 106(1)-(N) and maintained in physical storage resources 108(1)-(N) include virtual disks used by VMs, and more specifically base disks and delta disks used by linked clones. For example, FIG. 2A depicts a scenario in which two linked clones 202 and 204 are created from a parent VM snapshot 206, resulting in a base disk 208 on node 102(2), a linked clone delta disk 210 for linked clone 202 on node 102(1), and a linked clone delta disk 212 for linked clone 204 on node 102(3). In this scenario, the parent VM is assumed to be powered off and thus there is no delta disk for the parent. Base disk 208, which is shared by linked clones 202 and 204, is a snapshot of a virtual disk of the parent VM that is included in parent VM snapshot 206.

Figure 2B:
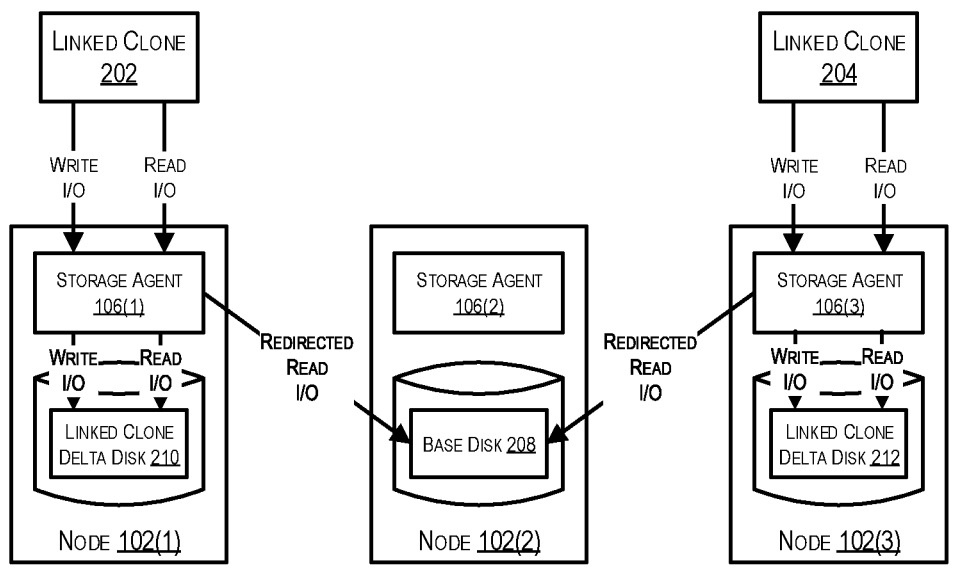

In addition, FIG. 2B depicts the flow of I/O requests from linked clones 202 and 204 to disks 208-212 on nodes 102(1)-(3). As shown in FIG. 2B, write requests issued by linked clones 202 and 204 are received by storage agents 106(1) and 106(3) of nodes 102(1) and 102(3) and directly forwarded to linked clone delta disks 210 and 212 for execution/fulfillment. On the other hand, read requests issued by linked clones 202 and 204 are received by storage agents 106(1) and 106(3) and first checked to determine whether they can be fulfilled by the linked clones' respective linked clone delta disks 210 and 212. Read requests that can be fulfilled by the linked clone delta disks are forwarded there; the remaining read requests are redirected to base disk 208 on node 102(2).

As noted in the Background section, one issue with linked cloning is that the base disk shared by a parent VM and its linked clones can become a performance bottleneck as the number of linked clones scales upward. For example, although FIGS. 2A and 2B depict only two linked clones for purposes of illustration, in certain real-world scenarios several hundreds, or thousands, of linked clones may be created from a single parent VM snapshot. In these scenarios, the base disk will need to serve read requests originating from those multitude of linked clones, resulting in heavy congestion at the base disk.

A workaround for this problem is to employ full cloning rather than linked cloning. Unlike a linked clone, a full clone does not share a base disk with its parent VM or with other full clones; instead, each full clone is given its own, independent copy of the parent VM's virtual disk, which eliminates the shared base disk as a point of congestion. However, full cloning is not a practical solution for many environments because it suffers from poor storage efficiency and slow clone creation times.

To address the foregoing and other similar issues, distributed storage system 100 of FIG. 1 includes, in each storage agent 106, a base disk mirror manager (hereinafter referred to as simply "mirror manager") 110 and an enhanced read I/O handler 112. Taken together, these components enable distributed storage system 100 to implement dynamic base disk mirroring, which generally involves (1) creating mirrors (i.e., copies) of a base disk in response to high congestion at the base disk (also referred to as "expanding the base disk's mirror set"), (2) load balancing incoming read requests across the base disk and its mirrors using a congestion-based algorithm, and (3) deleting base disk mirrors created via (1) in response to reductions in load at the base disk and its mirrors (also referred to as "shrinking/contracting the base disk's mirror set").

Figure 3A:
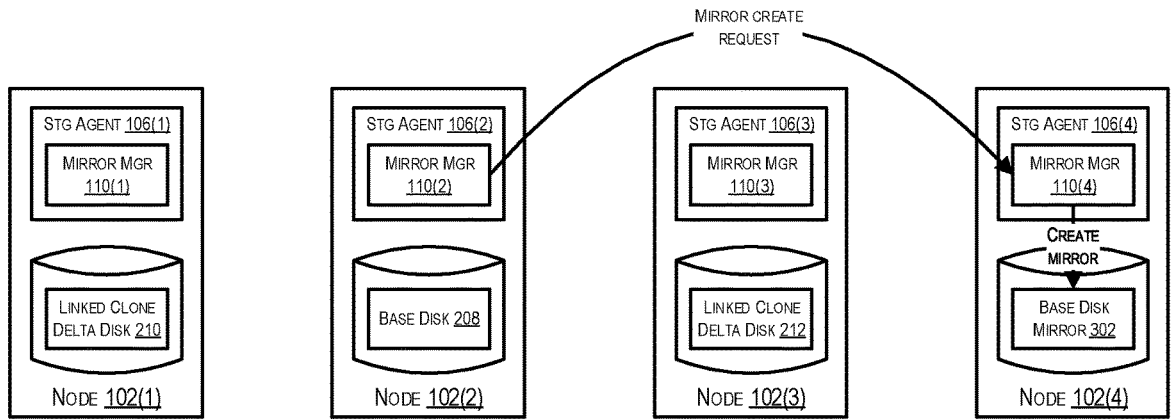
FIGS. 3A, 3B, and 3C depict example results of applying dynamic base disk mirroring to the scenario of FIGS. 2A and 2B according to certain embodiments.

For example, with respect to the scenario depicted in FIGS. 2A and 2B, mirror manager 110(2) running at node 102(2) can continuously monitor the congestion level of base disk 208. Upon determining that the congestion level of base disk 208 has exceeded a threshold (because of, e.g., a high number of incoming read requests from linked clones 202 and 204), mirror manager 110(2) can cause a new mirror of base disk 208 to be created on another node of distributed storage system 100. This is illustrated in FIG. 3A, which shows mirror manager 110(2) sending a request to mirror manager 110(4) of node 102(4) to create a base disk mirror 302 on node 102(4). In addition, mirror manager 110(2) can update a mirror set for base disk 208 to reflect the newly created mirror and communicate the updated mirror set to all other nodes (or to those specific nodes that maintain a linked clone delta disk associated with base disk 208, such as nodes 102(1) and 102(3)).

Figure 3B:
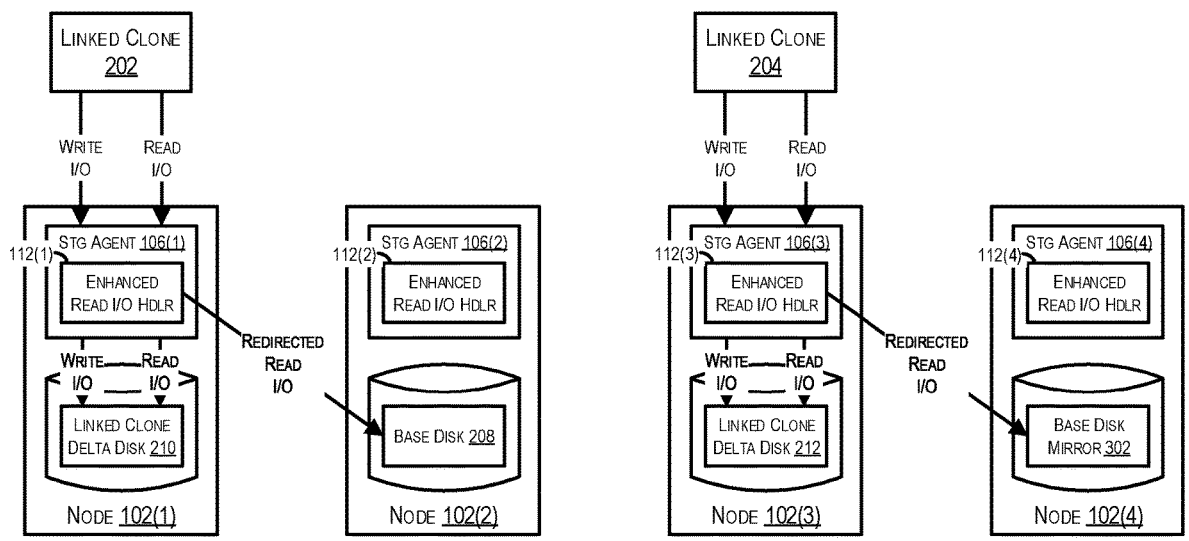

Further, at the time storage agents 106(1) and 106(3) receive read requests from linked clones 202 and 204 that cannot be fulfilled by their respective linked clone delta disks 210 and 212, enhanced read I/O handlers 112(1) and 112(3) of storage agents 106(1) and 106(3) can select, based on the current congestion levels of base disk 208 and its mirrors (and/or other criteria such as network locality, etc.), one of those disks as the target for serving the read requests. The enhanced read I/O handlers can then redirect the read requests to the selected target. This is illustrated in FIG. 3B, which shows read requests from linked clone 204 being redirected, via enhanced read I/O handler 112(3), to base disk mirror 302 on node 102(4), rather than to base disk 208 on node 102(2). In this example, read requests from linked clone 202 continue to be redirected to base disk 208.

Figure 3C:
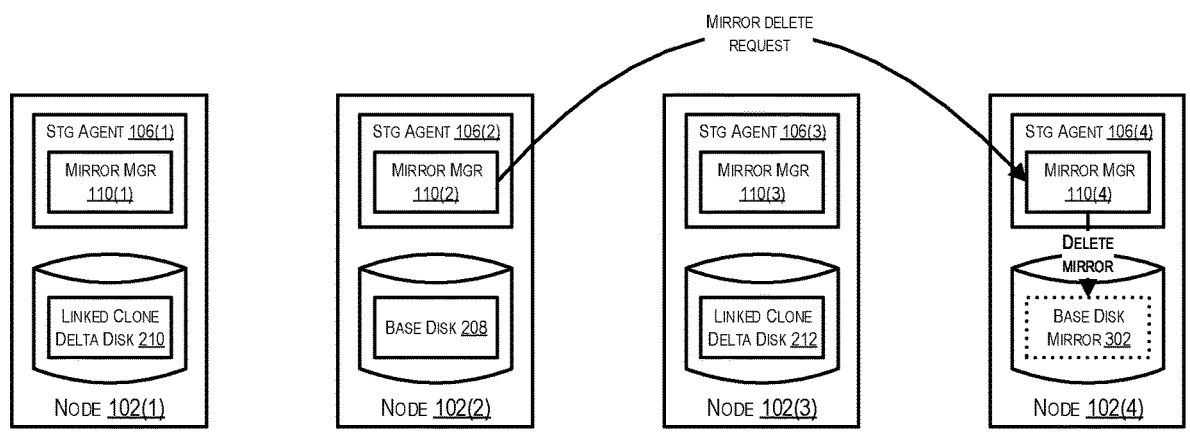

Yet further, concurrently with the above, mirror manager 110(2) (either alone in cooperation with other mirror managers) can monitor the overall load and/or other metrics of base disk 208 and its mirrors. Upon determining that the overall load has fallen below a threshold, mirror manager 110(2) can cause one of the base disk mirrors to be deleted. This is illustrated in FIG. 3C, which shows mirror manager 110(2) sending a request to mirror manager 110(4) to delete previously created mirror 302. Mirror manager 110(2) can then remove the deleted base disk mirror from the mirror set for base disk 208 and communicate the updated mirror set to all other nodes (or to those specific nodes that maintain a linked clone delta disk associated with base disk 208 (i.e., nodes 102(1) and 102(3)). The outcome of these steps is that the enhanced read I/O handlers will no longer consider the deleted base disk mirror as a potential load balancing target for read requests destined for base disk 208.

With the high-level approach described above, a number of advantages are achieved. First, during time periods in which base disk 208 is not congested, there is no change in how base disk 208 is accessed by linked clones 202 and 204 and no change in the amount of storage space consumed on distributed storage system 100. However, once base disk 208 become congested beyond a threshold, this approach dynamically trades off some storage efficiency for performance by creating one or more base disk mirrors, which allows the read I/O load on base disk 208 to be load balanced across those mirrors and thus prevents base disk 208 from becoming a bottleneck. Conversely, once one or more of the base disk mirrors are no longer needed, this approach deletes those mirrors and thus reclaims the storage space they previously consumed. As a result, dynamic base disk mirroring is a flexible solution that significantly mitigates the performance problems of sharing a single base disk among many linked clones, while maintaining good storage efficiency when congestion levels are low (and significantly better average storage efficiency than full cloning). In certain embodiments, an administrator of distributed storage system 100 can tune this mechanism by configuring the congestion/load thresholds at which new mirrors are created and existing mirrors are deleted, as well as setting high and low watermarks that indicate the maximum and minimum number of mirrors allowed for a given base disk.

Second, dynamic base disk mirroring is transparent to the storage clients (i.e., linked clones) accessing the base disk; from the perspective of those storage clients, all read requests that cannot be served by their delta disks appear to be served by the base disk, even though the read requests may in fact be redirected to and served by a base disk mirror. Accordingly, there is no need for any storage client-side modifications with this approach.

It should be appreciated that the system architecture depicted in FIG. 1 is illustrative and not intended to limit embodiments of the present disclosure. For example, although mirror managers 110(1)-(N) are shown as being part of storage agents 106(1)-(N) of nodes 102(1)-(N), in some embodiments the functionality attributed to these mirror managers may be performed by a centralized entity connected to nodes 102(1)-(N) or by a single master node selected from among nodes 102(1)-(N). Further, the various entities/components depicted in FIG. 1 may include subcomponents and/or functions that are not specifically described. One of ordinary skill in the art will recognize other variations, modifications, and alternatives.

3. Mirror Set Expansion

Figure 4:
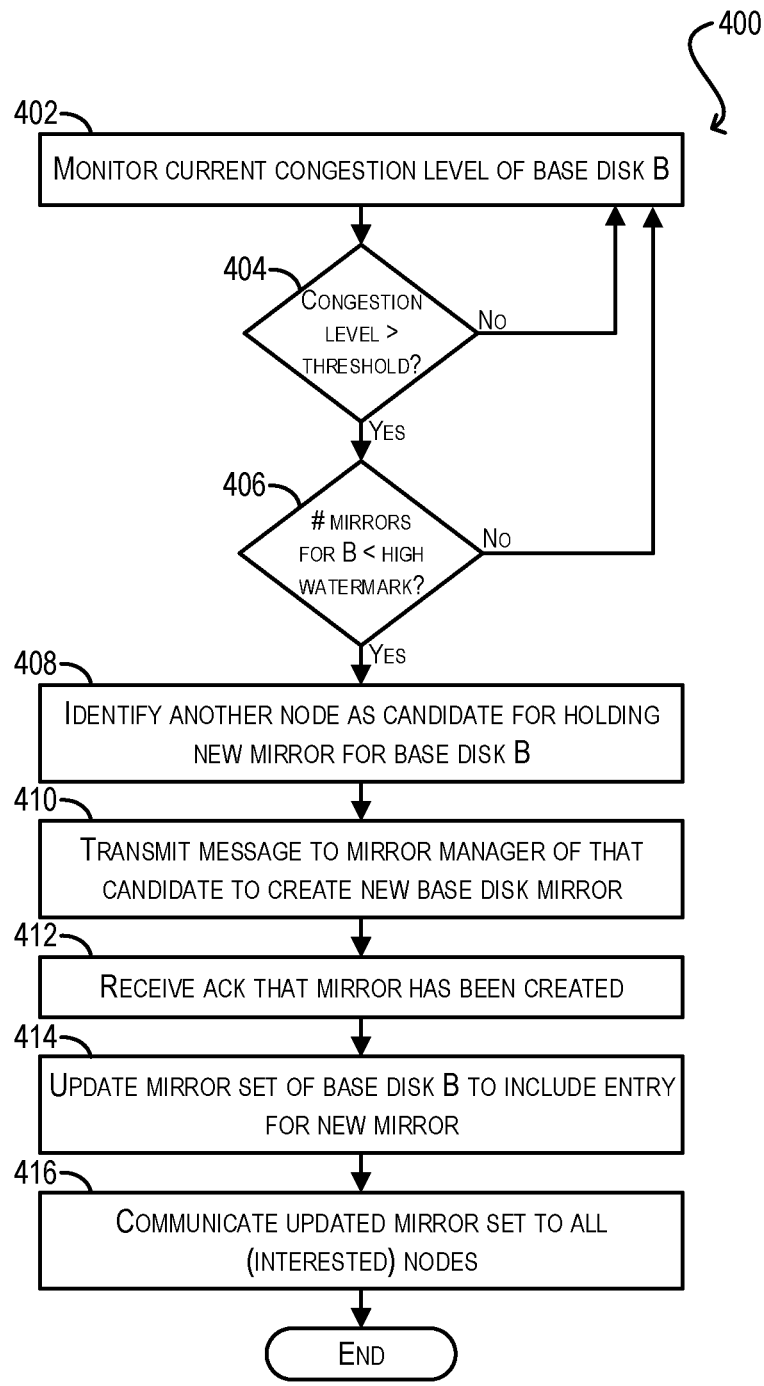
FIG. 4 depicts a mirror set expansion workflow according to certain embodiments.

FIG. 4 depicts a workflow 400 that can be executed by a mirror manager 110(i) of FIG. 1 for creating a new mirror of a base disk B residing on node 102(i) according to certain embodiments.

Starting with block 402, mirror manager 110(i) can monitor the current congestion level of base disk B. This congestion level can be based on one or more statistics such as the number of concurrent I/O requests being serviced by base disk B, the status of base disk B's buffer, the average latency base disk B over a moving time window, and so on.

At block 404, mirror manager 110(i) can check whether the current congestion level is greater than a congestion threshold. If the answer is no, mirror manager 110(i) can return to its monitoring at block 402.

However, if the answer at block 404 is yes, mirror manager 110(i) can further check whether the current number of base disk mirrors for base disk B is less than a high watermark (block 406). If the answer at block 406 is no, mirror manager 110(i) can return to its monitoring at block 402 (and/or generate a notification for the system administrator that the mirror set of base disk B cannot be expanded).

However, if the answer at block 406 is yes, mirror manager 110(i) can identify another node of distributed storage system 100 as a candidate for holding a new mirror of base disk B (block 408) and can transmit a message to the mirror manager of that node requesting creation of a base disk mirror there (block 410). In one set of embodiments, mirror manager 110(i) can identify this candidate based on the node topology of distributed storage system 100; for example, mirror manager 110(i) may select a node that is furthest away from node 102(i). In other embodiments, mirror manager 110(i) can identify this candidate based on criteria such as the locations of the linked clone delta disks associated with base disk B, the amount of free storage space on each node, etc.

At block 412, mirror manager 110(i) can receive an acknowledgement from the mirror manager of the candidate node that the new base disk mirror has been successfully created. In response, mirror manager 110(i) can update a mirror set for base disk B to include an entry for the newly created mirror (block 414). This entry can comprise, e.g., an identifier and network address of the mirror.

Finally, at block 416, mirror manager 110(i) can communicate the updated mirror set for base disk B to all of the mirror managers in distributed storage system 100, or alternatively to a subset of mirror managers that have an interest in base disk B. Such a subset may include mirror managers residing at nodes that maintain either a base disk mirror or a linked clone delta disk that is associated with base disk B.

4. Read Request Handling

Figure 5:
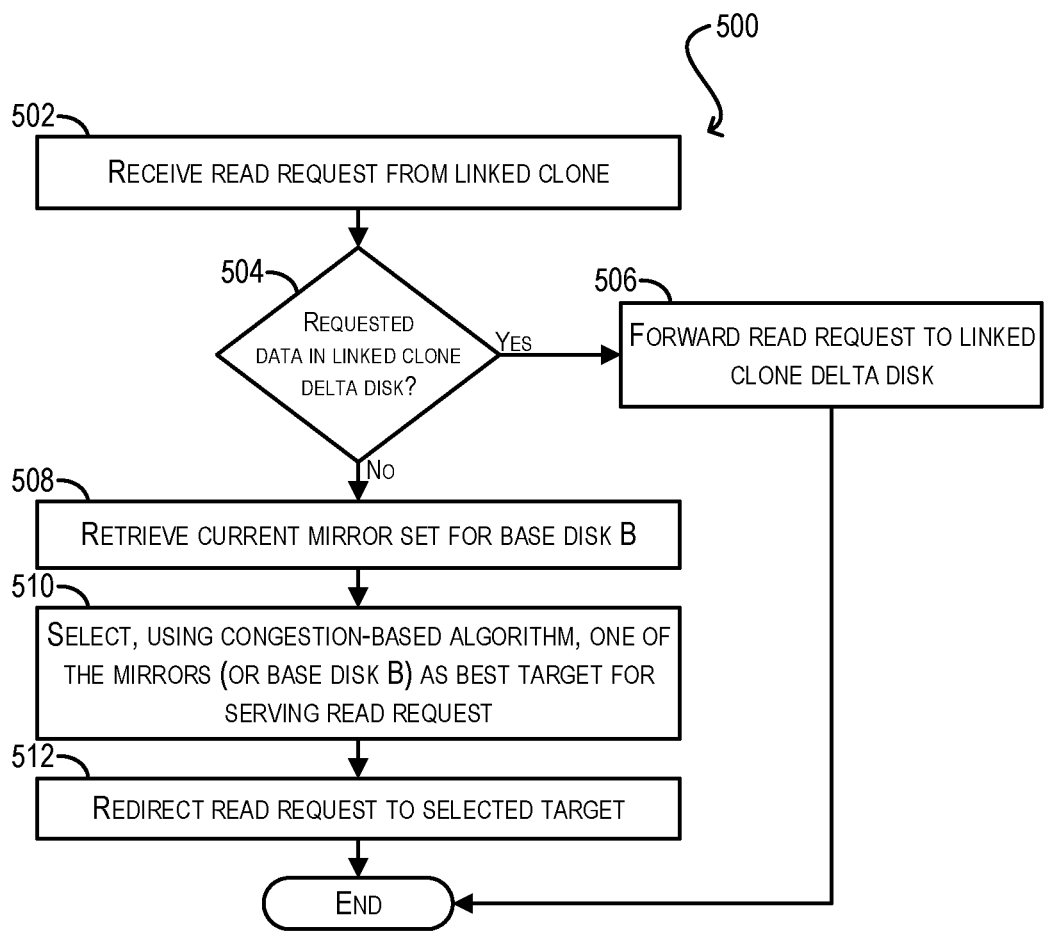
FIG. 5 depicts a read request handling workflow according to certain embodiments.

FIG. 5 depicts a workflow 500 that can be executed by an enhanced read I/O handler 112(j) of FIG. 1 for processing a read request issued by a linked clone that is sharing base disk B according to certain embodiments. Workflow 500 assumes that one or more mirrors of base disk B have been created in distributed storage system 100 via workflow 400 of FIG. 4.

Starting with blocks 502 and 504, enhanced read I/O handler 112(j) can receive the read request from the linked clone and check whether the requested data in the read request is present in the linked clone's linked clone delta disk. If the answer is yes, enhanced read I/O handler 112(j) can forward the read request to the linked clone delta disk for servicing/fulfillment (block 506) and workflow 500 can end.

However, if the answer at block 504 is no, enhanced read I/O handler 112(j) can retrieve the current mirror set for base disk B (block 508) and select, using a congestion-based algorithm, one of the mirrors in the mirror set (or base disk B itself) as the best target for serving the read request (block 510). In one set of embodiments, this algorithm can involve checking the current congestion level of base disk B and each mirror and selecting the disk with the lowest congestion level. If there is a tie in congestion level, the algorithm can further determine the network locality of base disk B and each mirror with respect to the handler's node (i.e., node 102(j)) and select the disk whose node is closest to node 102(j). If there is a tie in network locality, the algorithm can use a round robin scheme to select the target.

Finally, at block 512, enhanced read I/O handler 112(j) can redirect/forward the read request to the selected target and workflow 500 can end.

5. Mirror Set Contraction

Figure 6:
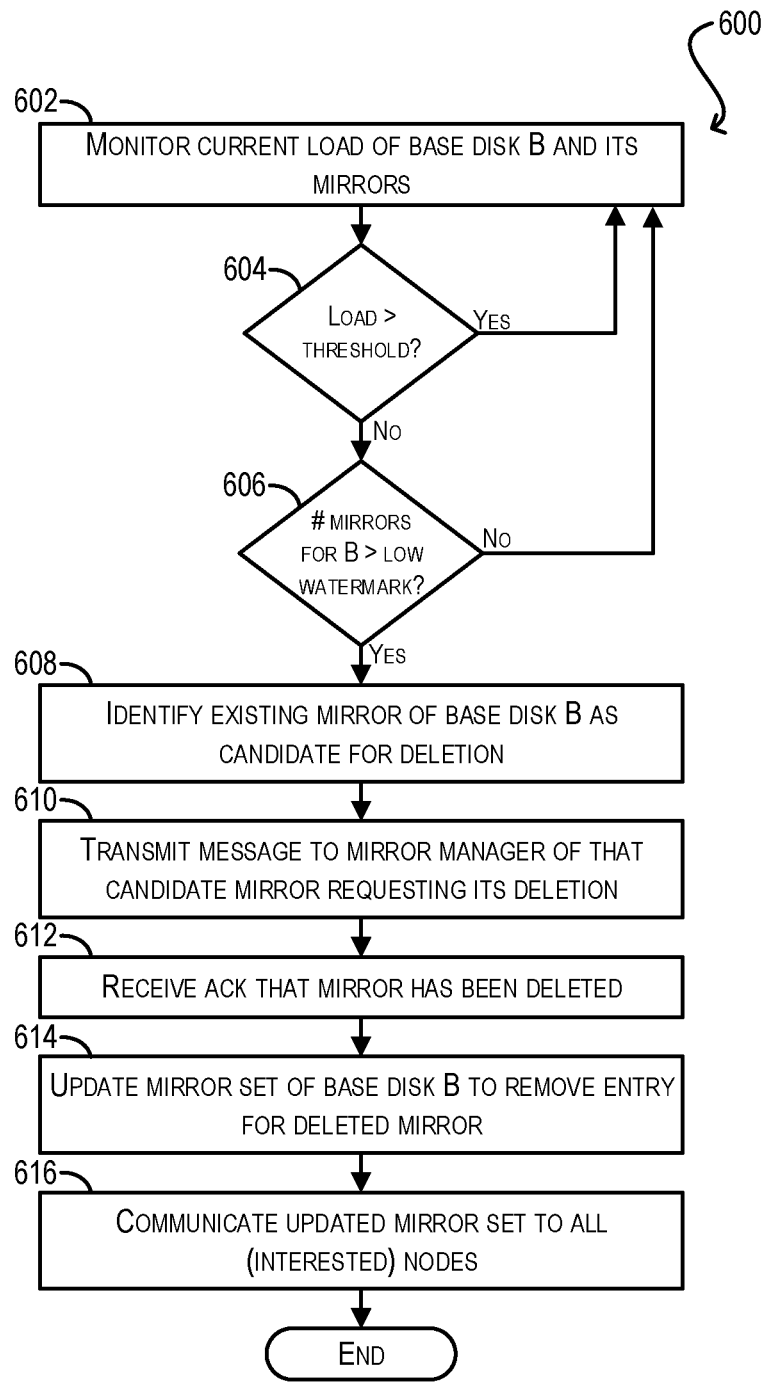
FIG. 6 depicts a mirror set contraction workflow according to certain embodiments.

FIG. 6 depicts a workflow 600 that can be executed by mirror manager 110(i) of FIG. 1 for deleting a mirror of base disk B that it previously created via workflow 400 according to certain embodiments.

Starting with blocks 602 and 604, mirror manager 110(i) can monitor the current load (and/or other metrics) of base disk B and its mirrors and check whether the load is greater than a load threshold. If the answer is yes, mirror manager 110(i) can return to its monitoring at block 402.

However, if the answer at block 604 is no, mirror manager 110(i) can further check whether the current number of base disk mirrors for base disk B greater than a low watermark (block 606). If the answer at block 606 is no, mirror manager 110(i) can return to its monitoring at block 602 (and/or generate a notification for the system administrator that the mirror set of base disk B cannot be contracted).

However, if the answer at block 606 is yes, mirror manager 110(i) can identify one of the mirrors of base disk B as candidate for deletion (block 608) and can transmit a message to the mirror manager at the node of that mirror requesting that it be deleted (block 610). As with the mirror creation workflow, mirror manager 110(*i*) can identify this deletion candidate based on the node topology of distributed storage system 100 and/or other criteria (e.g., the locations of the linked clone delta disks associated with base disk B, the amount of free storage space on each node, etc.).

At block 612, mirror manager 110(*i*) can receive an acknowledgement that the base disk mirror has been successfully deleted. Finally, mirror manager 110(*i*) can update the mirror set for base disk B to remove the entry for the deleted mirror (block 614) and communicate the updated mirror set for base disk B to all of the mirror managers in distributed storage system 100 (or the subset of mirror managers interested in base disk B) (block 616).

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general-purpose computer system selectively activated or configured by program code stored in the computer system. In particular, various general-purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid-state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while certain virtualization methods referenced herein have generally assumed that virtual machines present interfaces consistent with a particular hardware system, persons of ordinary skill in the art will recognize that the methods referenced can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method comprising:

monitoring, by a first node in a distributed storage system, a congestion level of a base disk residing on the first node, wherein the base disk is shared by a plurality of linked clones created from a parent virtual machine (VM) snapshot, and wherein each linked clone is associated with a linked clone delta disk that is specific to the linked clone and comprises changes made by the linked clone to data in the base disk;

upon determining that the congestion level exceeds a first threshold, sending, by the first node to a second node in the distributed storage system, a request to create a mirror of the base disk on the second node, the mirror being a read-only copy of the base disk;

upon receiving an acknowledgement from the second node that the mirror has been successfully created on the second node, updating, by the first node, a mirror set associated with the base disk to include an entry identifying the mirror;

communicating, by the first node, the mirror set to one or more other nodes in the distributed storage system;

receiving, by a third node in the distributed storage system, a read request from a first linked clone in the plurality of linked clones for reading data on the base disk;

upon determining that the data is not present on a linked clone delta disk of the first linked clone:

retrieving, by the third node, the mirror set communicated by the first node;
selecting, by the third node, either the base disk or the mirror identified in the mirror set as a target for serving the read request; and
redirecting, by the third node, the read request to the selected target.

2. The method of claim 1 wherein the selecting is based on current congestion levels of the base disk and the mirror.

3. The method of claim 2 wherein if there is a tie in current congestion levels of the base disk and the mirror, the selecting is further based on network locality between the first node and the third node and between the second node and the third node.

4. The method of claim 1 further comprising:
monitoring a load metric of the base disk and the mirror;
upon determining that the load metric is below a second threshold, sending, to the second node, a request to delete the mirror;
upon receiving an acknowledgement from the second node that the mirror has been successfully deleted, updating the mirror set to remove the entry identifying the mirror; and
communicating the mirror set to the one or more other nodes.

5. The method of claim 1 wherein the congestion level corresponds to a number of concurrent I/O requests being served by the base disk or a status of a buffer of the base disk.

6. The method of claim 1 wherein the first threshold and a total number of allowable mirrors of the base disk are defined by an administrator of the distributed storage system.

7. A non-transitory computer readable storage medium having stored thereon program code executable by a first node of a distributed storage system, the program code embodying a method comprising:
monitoring a congestion level of a base disk residing on the first node, wherein the base disk is shared by a plurality of linked clones created from a parent virtual machine (VM) snapshot, and wherein each linked clone is associated with a linked clone delta disk that is specific to the linked clone and comprises changes made by the linked clone to data in the base disk;
upon determining that the congestion level exceeds a first threshold, sending, to a second node in the distributed storage system, a request to create a mirror of the base disk on the second node, the mirror being a read-only copy of the base disk;
upon receiving an acknowledgement from the second node that the mirror has been successfully created on the second node, updating a mirror set associated with the base disk to include an entry identifying the mirror; and
communicating the mirror set to one or more other nodes in the distributed storage system,
wherein a third node in the distributed storage system:
receives a read request from a first linked clone in the plurality of linked clones for reading data on the base disk; and
upon determining that the data is not present on a linked clone delta disk of the first linked clone:
retrieves the mirror set communicated by the first node;
selects either the base disk or the mirror identified in the mirror set as a target for serving the read request; and
redirects the read request to the selected target.

8. The non-transitory computer readable storage medium of claim 7 wherein the selecting is based on current congestion levels of the base disk and the mirror.

9. The non-transitory computer readable storage medium of claim 8 wherein if there is a tie in current congestion levels of the base disk and the mirror, the selecting is further based on network locality between the first node and the third node and between the second node and the third node.

10. The non-transitory computer readable storage medium of claim 7 wherein the method further comprises:
monitoring a load metric of the base disk and the mirror;
upon determining that the load metric is below a second threshold, sending, to the second node, a request to delete the mirror;
upon receiving an acknowledgement from the second node that the mirror has been successfully deleted, updating the mirror set to remove the entry identifying the mirror; and
communicating the mirror set to the one or more other nodes.

11. The non-transitory computer readable storage medium of claim 7 wherein the congestion level corresponds to a number of concurrent I/O requests being served by the base disk or a status of a buffer of the base disk.

12. The non-transitory computer readable storage medium of claim 7 wherein the first threshold and a total number of allowable mirrors of the base disk are defined by an administrator of the distributed storage system.

13. A node in a distributed storage system comprising:
a processor; and
a non-transitory computer readable medium having stored thereon program code that, when executed, causes the processor to:
monitor a congestion level of a base disk residing on the node, wherein the base disk is shared by a plurality of linked clones created from a parent virtual machine (VM) snapshot, and wherein each linked clone is associated with a linked clone delta disk that is specific to the linked clone and comprises changes made by the linked clone to data in the base disk;
upon determining that the congestion level exceeds a first threshold, send, to another node in the distributed storage system, a request to create a mirror of the base disk on said another node, the mirror being a read-only copy of the base disk;
upon receiving an acknowledgement from said another node that the mirror has been successfully created, update a mirror set associated with the base disk to include an entry identifying the mirror; and
communicate the mirror set to one or more other nodes in the distributed storage system,
wherein yet another node in the distributed storage system:
receives a read request from a first linked clone in the plurality of linked clones for reading data on the base disk; and
upon determining that the data is not present on a linked clone delta disk of the first linked clone:
retrieves the mirror set communicated by the node;
selects either the base disk or the mirror identified in the mirror set as a target for serving the read request; and
redirects the read request to the selected target.

14. The node of claim 5 wherein the selecting is based on current congestion levels of the base disk and the mirror.

15. The node of claim 14 wherein if there is a tie in current congestion levels of the base disk and the mirror, the selecting is further based on network locality between the node and said yet another node and between said another node and said yet another node.

16. The node of claim 13 wherein the program code further causes the processor to:
   monitor a load metric of the base disk and the mirror;
   upon determining that the load metric is below a second threshold, send, to said another node, a request to delete the mirror;
   upon receiving an acknowledgement from said another node that the mirror has been successfully deleted, update the mirror set to remove the entry identifying the mirror; and
   communicate the mirror set to the one or more other nodes.

17. The node of claim 13 wherein the congestion level corresponds to a number of concurrent I/O requests being served by the base disk or a status of a buffer of the base disk.

18. The node of claim 13 wherein the first threshold and a total number of allowable mirrors of the base disk are defined by an administrator of the distributed storage system.

* * * * *